(12) United States Patent
Mancka et al.

(10) Patent No.: US 10,328,421 B2
(45) Date of Patent: *Jun. 25, 2019

(54) ALUMINA SILICATE ZEOLITE-TYPE MATERIAL HAVING PROLONGED ACID STRENGTH FOR USE AS A CATALYST IN SELECTIVE CATALYTIC REDUCTION AND PROCESS OF MAKING THEREOF

(71) Applicant: Pacific Industrial Development Corporation, Ann Arbor, MI (US)

(72) Inventors: Manjola Mancka, Dexter, MI (US); Yunkui Li, Ann Arbor, MI (US); Jeffery LaChapelle, Northville, MI (US); Wei Wu, Ann Arbor, MI (US); David Shepard, Ann Arbor, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 547 days.

This patent is subject to a terminal disclaimer.

(21) Appl. No.: 14/669,187

(22) Filed: Mar. 26, 2015

(65) Prior Publication Data

US 2015/0266007 A1 Sep. 24, 2015

Related U.S. Application Data

(63) Continuation of application No. PCT/US2011/062083, filed on Sep. 27, 2013.
(Continued)

(51) Int. Cl.
*B01D 53/86* (2006.01)
*B01J 29/70* (2006.01)
(Continued)

(52) U.S. Cl.
CPC .......... *B01J 29/70* (2013.01); *B01D 53/8628* (2013.01); *B01D 53/9418* (2013.01);
(Continued)

(58) Field of Classification Search
None
See application file for complete search history.

(56) References Cited

U.S. PATENT DOCUMENTS 4,665,110 A 5/1987 Zones
4,859,442 A 8/1989 Zones
(Continued)

FOREIGN PATENT DOCUMENTS

JP S62216914 A 9/1987
JP 2010519038 A 6/2010
(Continued)

OTHER PUBLICATIONS

International Search Report for PCT/US2013/062083 dated Jan. 7, 2014.
(Continued)

*Primary Examiner* — Colin W. Slifka
(74) *Attorney, Agent, or Firm* — Brinks Gilson & Lione

(57) ABSTRACT

The present disclosure generally provides novel STT-type zeolite materials called PIDC-120501, PIDC-120502, and PIDC-120805/120806 or PIDC-type zeolites and a method of making these zeolites. The present disclosure also provides for the use of these zeolite materials as a catalyst and a method of preparing said catalyst. The PIDC-type zeolites or STT-type zeolite materials may be used as a catalyst, such as in Selective Catalytic Reduction (SCR) applications.

19 Claims, 11 Drawing Sheets

Related U.S. Application Data

(60) Provisional application No. 61/707,385, filed on Sep. 28, 2012, provisional application No. 61/791,709, filed on Mar. 15, 2013.

(51) Int. Cl.

| | |
|---|---|
| B01J 29/76 | (2006.01) |
| B01J 35/00 | (2006.01) |
| B01J 35/04 | (2006.01) |
| B01J 37/00 | (2006.01) |
| B01J 37/02 | (2006.01) |
| B01J 37/08 | (2006.01) |
| C01B 39/08 | (2006.01) |
| C01B 39/48 | (2006.01) |
| B01J 29/72 | (2006.01) |
| B01D 53/94 | (2006.01) |

(52) U.S. Cl.
CPC ........... *B01J 29/7049* (2013.01); *B01J 29/72* (2013.01); *B01J 29/76* (2013.01); *B01J 35/0006* (2013.01); *B01J 35/04* (2013.01); *B01J 37/0018* (2013.01); *B01J 37/0201* (2013.01); *B01J 37/08* (2013.01); *C01B 39/08* (2013.01); *C01B 39/085* (2013.01); *C01B 39/087* (2013.01); *C01B 39/48* (2013.01); B01D 2253/108 (2013.01); B01D 2255/20707 (2013.01); B01D 2255/20715 (2013.01); B01D 2255/20738 (2013.01); B01D 2255/20746 (2013.01); B01D 2255/20761 (2013.01); B01D 2255/50 (2013.01); B01D 2255/9202 (2013.01); B01J 2229/16 (2013.01); B01J 2229/183 (2013.01)

(56) References Cited

U.S. PATENT DOCUMENTS

| | | |
|---|---|---|
| 8,404,203 B2 | 3/2013 | Bull et al. |
| 2012/0184429 A1* | 7/2012 | Andersen ........... B01D 53/9418 502/61 |
| 2013/0034482 A1 | 2/2013 | Zones et al. |

FOREIGN PATENT DOCUMENTS

| | | | |
|---|---|---|---|
| JP | 2010254535 A | 11/2010 | |
| WO | 2008/106519 | 9/2008 | |
| WO | WO-2011112949 A1 * | 9/2011 | ......... B01D 53/9418 |
| WO | 2013/022513 | 2/2013 | |

OTHER PUBLICATIONS

"Synthesis and Structural Characterization of MWW Type Zeolite ITQ-1, the Pure Silica Analog of MCM-22 and SSZ-25," by Miguel A. Camblor, Avelino Corina and Maria-Jose Diaz-Cabanas, Instituto de Tecnologia Quimica, CSIC-UPV, Universidad Politecnica de Valencia, Avda. Los Naranjos s/n, 46071 Valencia, Spain, J. Phys. Chem. B, vol. 102, No. 1, 1998, pp. 12-19.

"Sequence of High Silica Zeolites Found During Synthesis Experiments in the Presence of a Quaternary Admantammonium Cation," by S. I. Zones et al., Chevron Research Company, Richmond, California, from P.A. Jacob and R. A. van Santen (Editors), "Zeolites: Facts, Figures, Future," copyright 1989 Elsevier Science Publishers B.V., Amsterdam—Printed in the Netherlands, pp. 299-309.

* cited by examiner

[A]

[B]

[C]

ALUMINA SILICATE ZEOLITE-TYPE MATERIAL HAVING PROLONGED ACID STRENGTH FOR USE AS A CATALYST IN SELECTIVE CATALYTIC REDUCTION AND PROCESS OF MAKING THEREOF

CROSS REFERENCE TO RELATED APPLICATIONS

This application is a continuation of PCT Application Serial No. PCT/US2011/062083 filed Sep. 27, 2013, designating the United States and published in English, which claims the benefit of the filing date under 35 U.S.C. § 119(e) of U.S. Provisional Application No. 61/707,385 filed Sep. 28, 2012, and U.S. Provisional Application No. 61/791,709 filed Mar. 15, 2013, the entire contents of each of which are hereby incorporated herein by reference.

FIELD

This disclosure relates to an alumina silicate zeolite-type material for use as a catalyst in Selective Catalytic Reduction (SCR) reactions and a process of forming said catalyst.

BACKGROUND

The statements in this section merely provide background information related to the present disclosure and may not constitute prior art.

A zeolite is a crystalline aluminosilicate having a framework based on an extensive three dimensional network of oxygen ions. The fundamental building block of all zeolites is a tetrahedron of four oxygen anions surrounding a small silicon or aluminum ion. These tetrahedra are arranged so that each of the four oxygen anions is shared in turn with another silica or alumina tetrahedron. The crystal lattice extends in three-dimension, and the −2 charge, i.e., oxidation state, of each oxygen anion is accounted for. Each silicon ion has its +4 charge, balanced by the four tetrahedral oxygen anions, and the silica tetrahedral are therefore electrically neutral. Each aluminum tetrahedron has a −1 residual charge since the trivalent aluminum is bonded to four oxygen anions. This is balanced by cations that occupy non-framework positions and act as strong, acid-donating Brønsted sites as further described in the schematic below.

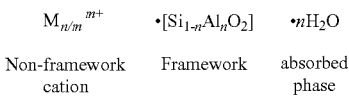

Non-framework cation — Framework — absorbed phase $M_{n/m}^{m+}$ •$[Si_{1-n}Al_nO_2]$ •$nH_2O$ High-silica containing zeolites or molecular sieves are typically prepared from an aqueous reaction mixture containing sources of an alkaline metal or an alkaline earth metal oxide; sources of an oxide of silicon; optionally sources of aluminum oxide; and a cation derived from 1-Adamantamine, its derivative N,N,N-trimethyl-1-adamantamonium hydroxide, and mixtures thereof. Fumed silica is used as the typical source of silicon oxide, while aluminum hydroxide is used as the typical source of aluminum oxide. The "as synthesized" crystalline zeolite formed by crystallization may then be subjected to further treatment. For example, the structure directing agent (SDA) can be removed by thermal treatment (i.e. calcination). Such further treatments include the removal of the metal cation by ion-exchange using known methods such as using a diluted acid solution or ammonium nitrate solutions.

U.S. Pat. No. 4,544,538, discloses a method of preparing the SSZ-13 molecular sieve in the presence of N,N,N-trimethyl-1-adamantamonium cation, which is known as the organic template and acts as the structure directing agent (SDA). The strongly directing template species control the course of the reaction by serving primarily to establish the pH conditions of the reaction mixture. The N,N,N-trimethyl-1-adamantamonium cation has been known to crystallize different zeolite structures in the presence of various amount of the inorganic metal.

Y. Nakagawa et al. in *Microporous and Mesoporous Materials*, 22, (1998) p. 69-85 have computationally determined five different zeolites that can be made using the N,N,N-trimethyl-1-adamantamonium cation. Their molecular modeling calculations agree with their experimental data. They have reported that this template crystallizes SSZ-13, SSZ-23, SSZ-24, SSZ-25, and SSZ-31 type of zeolites. They show the crystallization field boundaries for the five zeolites commonly made by two SDA's. N,N,N-trimethyl-1-adamantamonium SDA molecule crystallizes chabazite phase at SAR 10-40, while STT phase at SAR 50-70. Very few organic templates will produce the structure of SSZ-23.

SUMMARY

The present disclosure generally provides novel STT-type zeolite materials called PIDC-120501, PIDC-120502, and PIDC-120805/120806 or PIDC-type zeolites and a method of making these zeolites. The present disclosure also provides for the use of these zeolite materials as a catalyst and a method of preparing said catalyst. It is surprising that these novel material structures emerge as the product under the type of reaction and specific set of synthesis conditions described herein. The STT-type zeolite materials comprise a mole ratio greater than about 19:1 to about 250:1 of an oxide of a tetravalent element to an oxide of a trivalent element and can be characterized by specific peaks present in an x-ray diffraction pattern.

The PIDC-type zeolites or STT-type zeolite materials may be used as a catalyst, such as in SCR applications. The comparison of Temperature Programmed Desorption (TPD) studies for both ammonia and N-propylamine on the new PIDC type materials, indicate that they contain more strongly acidic sites than those of the known SSZ-13 zeolite. In TPD measurements, the acid strength of the synthesized zeolite is monitored by using probe molecules having basic character, such as ammonia and N-propylamine, and measuring the temperature at which they are desorbed.

The method of preparing the zeolite-type materials generally comprises forming an aqueous reaction mixture that comprises a source of the oxide of tetravalent element; a source of the oxide of the trivalent element; a source of alkali metal; and an organic structure directing agent wherein at least a portion of which includes N,N,N-trimethyl-1-adamantamonium hydroxide; maintaining the aqueous mixture under crystallization conditions sufficient to crystallize crystals of a zeolite type material exhibiting the specified x-ray diffraction pattern; and recovering the zeolite crystals.

The method of preparing a catalyst from the zeolite-type material comprises the steps of dealuminating the zeolite-type material with nitric acid to form a dealuminated zeolite; impregnating or ion-exchanging the dealuminated zeolite with an aqueous metal salt solution; and incorporating a metal selected as one from the group of Cu, Fe, Co, Zr, Ti, or a mixture thereof into the framework sites of dealuminated zeolite.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
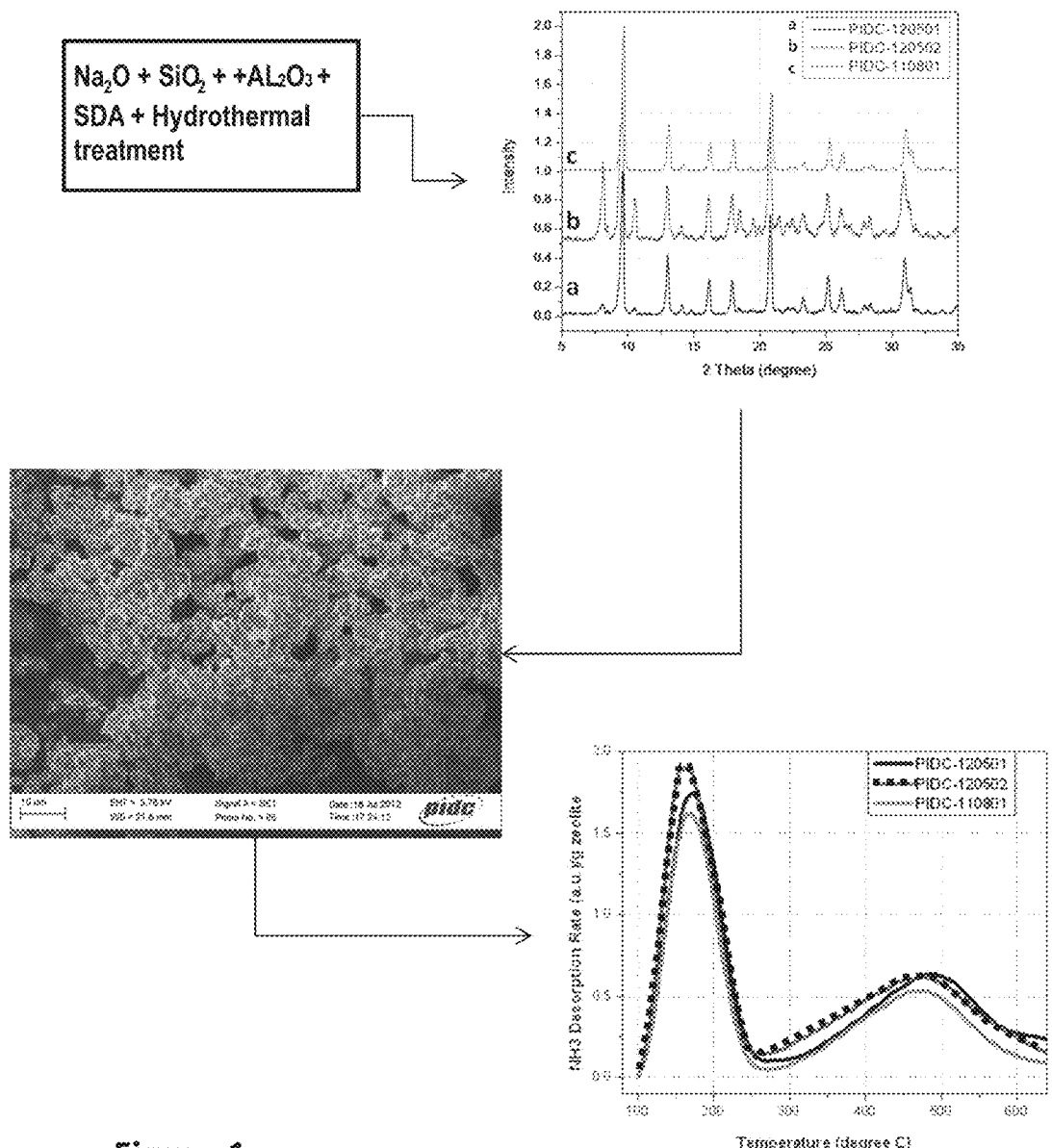
FIG. 1 is a schematic view of the preparation of a modified STT zeolite according to the teachings of the present disclosure.

The following description is merely exemplary in nature and is in no way intended to limit the present disclosure or its application or uses. It should be understood that throughout the description, corresponding reference numerals indicate like or corresponding parts and features.

The present disclosure generally provides a modified STT zeolite-type material that exhibits catalytic activity for Selective Catalytic Reduction (SCR) reactions. This zeolite-type material as prepared according to the synthesis conditions described herein exhibits high catalytic activity superior to the existing SSZ-13 type zeolite, as demonstrated by ammonia and N-propylamine temperature desorption studies. The presence of an STT-type zeolite was observed with the XRD reflections of the "as synthesized" material at d=1.08 (7.8%); 0.837 (4.0); 0.845 (3.6); 0.480 (4.5); 0.456 (3.8); 0.445 (1.6); 0.416 (4.0); and 0.364 (2.6) nm. The empirical composition for the gel formed during the preparation of the zeolite is represented as:

5.577 NaOH:4.428 RNOH:$Al_2O_3$:28 $SiO_2$:1219.7 $H_2O$.

The following specific embodiments are given to illustrate the preparation, identification, and use of modified STT zeolite-type materials prepared according to the teaching of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Referring to FIG. 1, the modified STT zeolite-type materials of the present disclosure are generally prepared by stirring the reactants until a homogeneous milky solution is obtained. The synthesis of the zeolite crystals is carried out in a 2.0 L Parr autoclave at 150° C. to 160° C. for 4 to 7 days. Upon cooling, the contents of the reactor vessel are poured into a filter and the crystals washed with distilled water and dried overnight at 120° C. After synthesis, the zeolite is calcined before ion exchange in order to remove the zeolite framework structure-directing agent.

The "as synthesized" crystalline zeolite formed by crystallization may be subjected to further treatment. For example, the template or structure directing agent (SDA) can be removed by thermal treatment (i.e. calcination). Such further treatments may also include the removal of the metal cation by ion-exchange via any methods known to one skilled in the art, including but not limited to methods that use diluted acid or ammonium nitrate solutions.

Metals may be introduced into the zeolite by replacing some of the existing cations with metal cations via standard ion exchange techniques, such as those described in U.S. Pat. Nos. 3,140,249, 3,140,251, and 3,140,253. Typical cation replacement may include the use of metal cations that are selected from the groups 1 through 12 of the Periodic Table, and mixtures thereof, with a preference toward the elements of the group 1, 2 and 8 of the Periodic Table.

Zeolites with transition metals incorporated within the framework exhibit different and very often valuable catalytic properties. For example, cobalt-containing zeolites have been the subject of much interest over the last years, largely because of their catalytic performance in the selective catalytic reduction (SCR) of nitrogen oxides with methane. This reaction is important because methane is expected to replace ammonia as a reductant of $NO_x$ emitted from stationary sources. U.S. Publication No. 2008/0226545A1 discloses the use of copper exchanged zeolites in the control of NOₓ emissions from gaseous media over a broad temperature range using selective catalytic reduction of nitrogen monoxide by ammonia.

A significant factor that affects the catalytic activity of zeolite catalysts is the preparation route selected for the catalyst. For example, Janas et al. in Applied Catalysis B: Environmental, 91, (2009), p. 217, describes the effect of copper content on the catalytic activity of a Copper beta zeolite (CuSiBEA) in the selective catalytic reduction (SCR) of NOₓ. It is possible to control the incorporation of copper into the framework of the beta zeolite by a two-step post-synthesis method to obtain the CuSIBEA catalyst.

The resulting products are characterized by XRD. The patterns are obtained from 5 to 35° 2θ using a step size of 0.02° 2θ. Scanning electron microscopy (SEM) images and energy-dispersive X-ray spectroscopy (EDAX) chemical analysis are obtained using a Carl-Zeiss microscope. Temperature desorption studies are carried out on a 2920 Micromeritics instrument coupled with a MKS Cirrus Mass Spectrometer. All synthesized materials are white powders.

The process of the present disclosure provides a method for synthesizing a metal containing modified STT-type zeolite with the as prepared silica to alumina mole ratio of 28:1 and the incorporation of a metal, such as copper, iron, cobalt, zirconium, titanium, or a mixture thereof into the framework sites of the dealuminated silica. The method comprises the steps of (1) dealumination of the zeolite with nitric acid, followed by (2) the impregnation of the resulting dealuminated zeolite with an aqueous metal salt solution, such as for example, a $Cu(NO_3)_2 \cdot H_2O$ solution. The metal cations from the metal salt solution occupy sites in the zeolite framework previously occupied by aluminum (Al) cations. The method may optionally comprise the step of heating the modified STT-type zeolite after impregnation with the aqueous metal salt solution to a temperature of at least 150° C., alternatively about 160° C. The amount of metal present in the metal containing modified STT-type zeolite ranges from about 0.3 to about 3.3%, based on the total weight of the metal containing modified STT-type zeolite. The zeolite framework has a pore size that is typically less than about 6 nanometers.

According to another aspect of the present disclosure, a method for preparing a modified STT-type zeolite for use in preparing a metal containing modified STT-type zeolite catalyst is provided. This method generally provides a modified STT-type zeolite having a mole ratio greater than about 19:1 of (A):(B), wherein (A) is an oxide of a tetravalent element oxide and (B) is an oxide of a trivalent element. The method comprises forming an aqueous reaction mixture comprising a source of (A); a source of (B); a source of alkali metal cations; and an organic structure directing agent (SDA), wherein at least a portion of the SDA includes N,N,N-trimethyl-1-adamantamonium hydroxide; maintaining the aqueous mixture under crystallization conditions sufficient to form crystals of STT-type zeolite and recovering the modified STT-type zeolite crystals.

The source of the alkali metal cation is preferably an alkali metal hydroxide with the alkali metal cation being part of the as-synthesized crystalline oxide material, thereby, balancing valence electron charges therein. For example, the tetravalent element may be silicon with the source (A) being fumed silica having a water content of about 2 wt. %, while the trivalent element may be aluminum with the source (B) being dried aluminum hydroxide having a water content less than or equal to about 63%. The resulting zeolite has a pore size that is typically less than about 6 nm.

Still referring to FIG. 1, the zeolite-type materials prepared according to the teachings of the present disclosure may be used as catalysts, such as in SCR applications. The acid strength of the synthesized zeolite samples is monitored by using the probe molecules with basic character, such as ammonia and N-propylammine, by measuring the temperature they are desorbed (temperature programmed desorption measurements). The acidity of the samples are measured by ammonia temperature-programmed desorption, and N-propylamine-TPD techniques. Optionally, the metal containing catalyst may be deposited onto a honeycomb structure including, but not limited to a wall flow substrate.

The replacement of aluminum within the structure of the zeolite with Cu, Fe, Co, Zr, Ti, or a mixture thereof increases the SCR activity of the zeolite catalyst. The modified STT-type zeolite with a metal in the framework lattice is capable of storing less ammonia. This metal substitution process reduces the amount of Brönsted Acid sites present in the catalyst and replaces such sites with Lewis Acid sites. Overall the metal replacement reduces the NOₓ slip that occurs in ammonia SCR catalysts.

The metal present in the catalyst may contain metal Cu, Fe, Co, Zr, or Ti sufficient to maintain NOₓ conversion performance in an exhaust gas stream containing nitrogen oxides. The NOₓ conversion performance of the fresh catalyst at about 500° C. is about 70%. When the catalyst is hydrothermally aged, the NOₓ conversion performance of the hydrothermally aged catalyst at about 200° C. is 30%.

EXAMPLE 1

Synthesis of PIDC-120501 Modified STT-type Zeolite Materials

Sodium hydroxide solution and N,N,N-trimethyl-1-adamantamonium hydroxide are combined. Aluminum hydroxide is added followed by silica Aerosil 200. To the obtained mixture D.I. water is added. The reactants are stirred until a homogeneous milky solution was obtained. The obtained slurry is transferred into a 2.0 L Parr stainless steel vessel and the vessel is sealed. The reactor vessel is heated at 160° C. for 6 days for the preparation of PIDC-120501 zeolite materials. Upon cooling, the contents of the reactor vessel are poured into a filter and the crystals are washed with distilled water and dried overnight at 120° C. After synthesis, the zeolites powder is calcined before ion exchange in order to remove the zeolite framework structure-directing agent.

Figure 2:
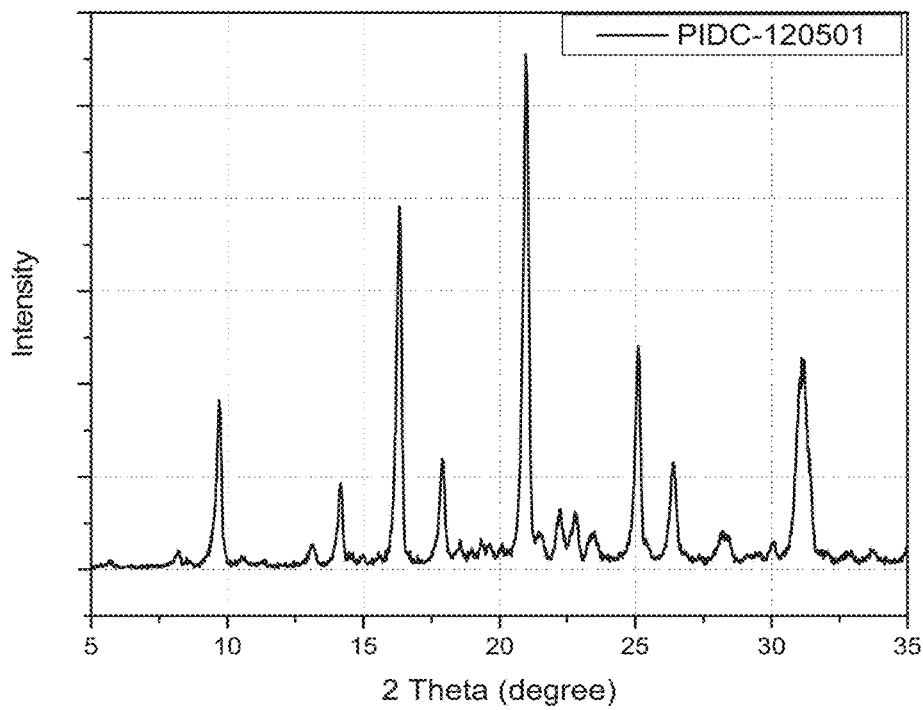
FIG. 2 is an x-ray powder diffraction analysis spectrum of a zeolite prepared according to Example 1.
Figure 3:
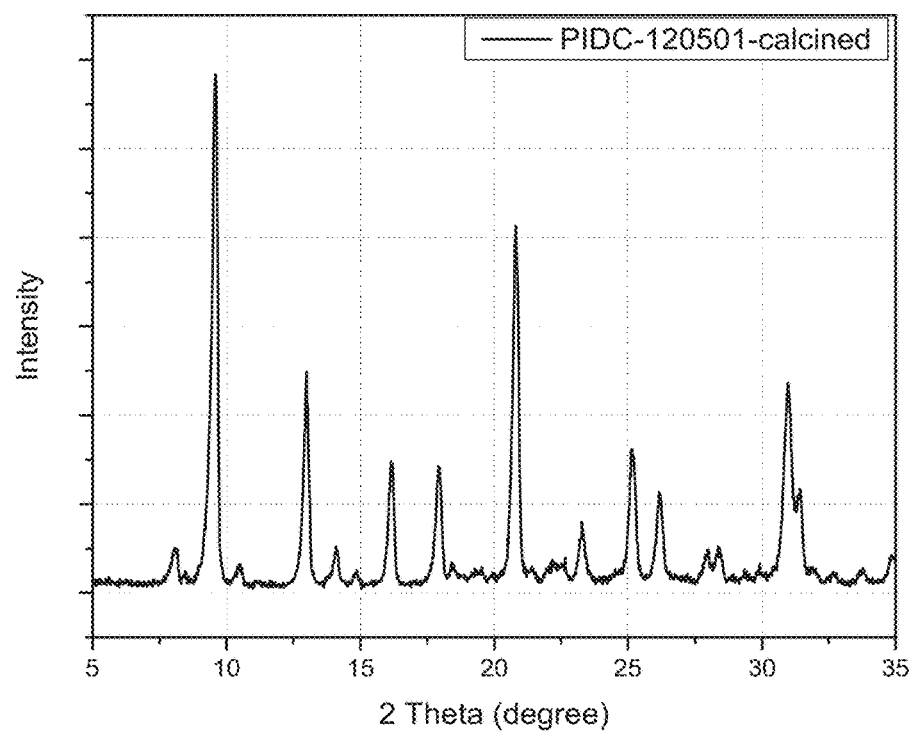
FIG. 3 is an X-ray powder diffraction analysis spectrum of the calcined zeolite prepared according to Example 1.

The X-ray diffraction pattern of the PIDC-120501 zeolite product obtained from this procedure is summarized below in Table 1, as well as being shown in FIGS. 2 and 3. The prepared zeolite comprises a mixture of SSZ-13 and SSZ-23 phases. In the x-ray diffraction pattern, each peak with a 2 theta at: 8.22, 9.68, 14.51, 15.55, 17.9, 18.58, 19.3, 19.66, 21.5, and 27.4 is attributed to the presence of an SSZ-23 phase, while the other peaks are attributed to the presence of an SSZ-13 phase.

TABLE 1

X-Ray Data for PIDC-120501 (Example 1)

| As synthesized | | | Calcined | | |
|---|---|---|---|---|---|
| 2 Theta | d (nm) | I (%) | 2 Theta | d (nm) | I (%) |
| 8.22 | 1.08 | 7.8 | 8.04 | 1.1 | 14.3 |

TABLE 1-continued

X-Ray Data for PIDC-120501 (Example 1)

| As synthesized | | | Calcined | | |
|---|---|---|---|---|---|
| 2 Theta | d (nm) | I (%) | 2 Theta | d (nm) | I (%) |
| 9.68 | 0.91 | 37.1 | 8.38 | 1.05 | 3.6 |
| 10.56 | 0.84 | 4 | 9.54 | 0.93 | 100 |
| 13.12 | 0.67 | 5.4 | 10.46 | 0.85 | 8.6 |
| 14.14 | 0.626 | 18.1 | 12.94 | 0.68 | 35.6 |
| 14.51 | 0.61 | 4.6 | 14.04 | 0.63 | 6.1 |
| 15.55 | 0.57 | 3.9 | 14.74 | 0.6 | 2.2 |
| 16.34 | 0.54 | 75 | 16.16 | 0.55 | 20.6 |
| 17.9 | 0.5 | 26.4 | 17.9 | 0.5 | 22.2 |
| 18.58 | 0.48 | 9.7 | 18.46 | 0.48 | 4.5 |
| 19.3 | 0.46 | 5.1 | 19.47 | 0.46 | 3.8 |
| 19.66 | 0.45 | 8.6 | 19.94 | 0.45 | 1.6 |
| 20.06 | 0.44 | 9.8 | 20.76 | 0.43 | 51.9 |
| 21 | 0.42 | 100 | 21.36 | 0.42 | 4 |
| 21.52 | 0.41 | 10.2 | 22.47 | 0.4 | 4.7 |
| 22.18 | 0.4 | 12.6 | 23.3 | 0.38 | 6.9 |
| 22.82 | 0.39 | 13.9 | 24.46 | 0.36 | 2.6 |
| 23.4 | 0.38 | 7.4 | 25.14 | 0.35 | 20.8 |
| 24.45 | 0.36 | 3.9 | 26.18 | 0.34 | 11.8 |
| 25.08 | 0.35 | 45.6 | 27.82 | 0.32 | 3.8 |
| 26.4 | 0.34 | 22 | 28.38 | 0.31 | 5.2 |
| 27.4 | 0.33 | 1.6 | 29.9 | 0.3 | 1.4 |
| 28.24 | 0.32 | 9.9 | 30.96 | 0.29 | 23.4 |
| 29.5 | 0.3 | 1.7 | 31.38 | 0.285 | 12.2 |
| 30.04 | 0.29 | 3.7 | 31.94 | 0.28 | 2.9 |
| 31.22 | 0.28 | 44.7 | | | |

EXAMPLE 2

Synthesis of PIDC-120502 and PIDC-120805/806 Modified STT Zeolite-Type Material

Sodium hydroxide solution and N,N,N-trimethyl-1-adamantamonium hydroxide are combined. Aluminum trihydroxide is added followed silica Aerosil 200. To the obtained mixture D.I. water is added. The reactants are stirred until a homogeneous milky solution was obtained. The obtained slurry is transferred into a 2.0 L Parr stainless steel vessel and the vessel is sealed. The reactor vessel is heated at 160° C. for 7 days. Upon cooling, the contents of the reactor vessel are poured into a filter and the crystals washed with distilled water and dried overnight at 120° C. Slight differences in heating temperature, temperature ramping, and in crystalization process leads to slight variations in morphology resulting in the PIDC-120502 and PIDC-120805/806 zeolite materials. After synthesis, the zeolites powders are calcined before ion exchange in order to remove the zeolite framework structure-directing agent.

Figure 4:
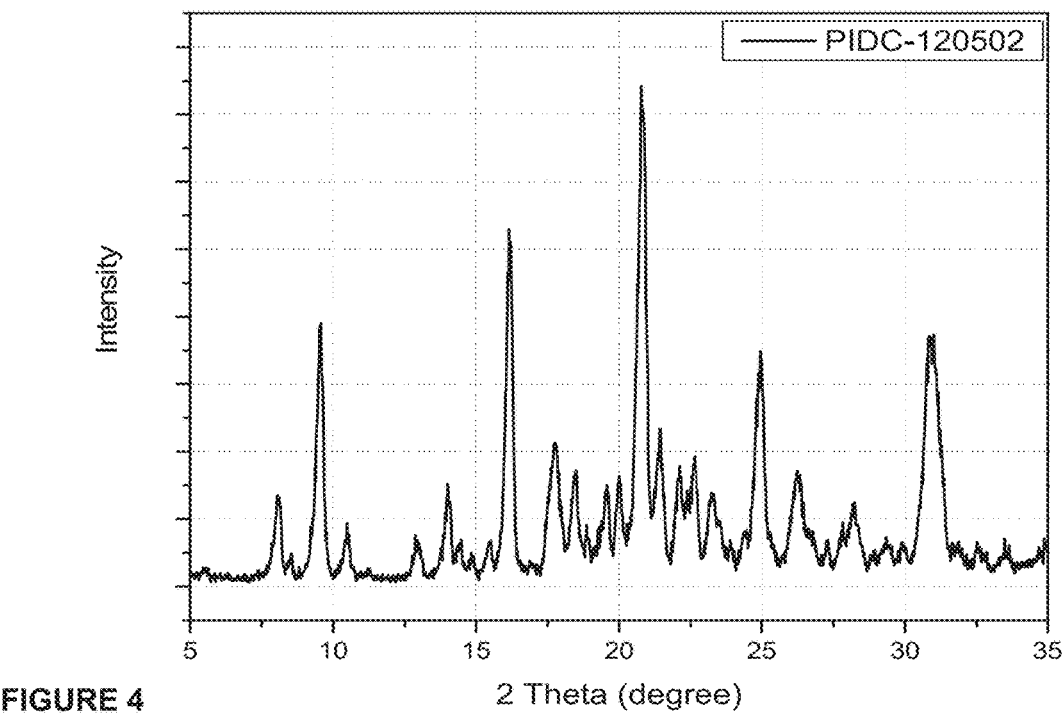
FIG. 4 is an X-ray powder diffraction analysis spectrum of a zeolite prepared according to Example 2.
Figure 5:
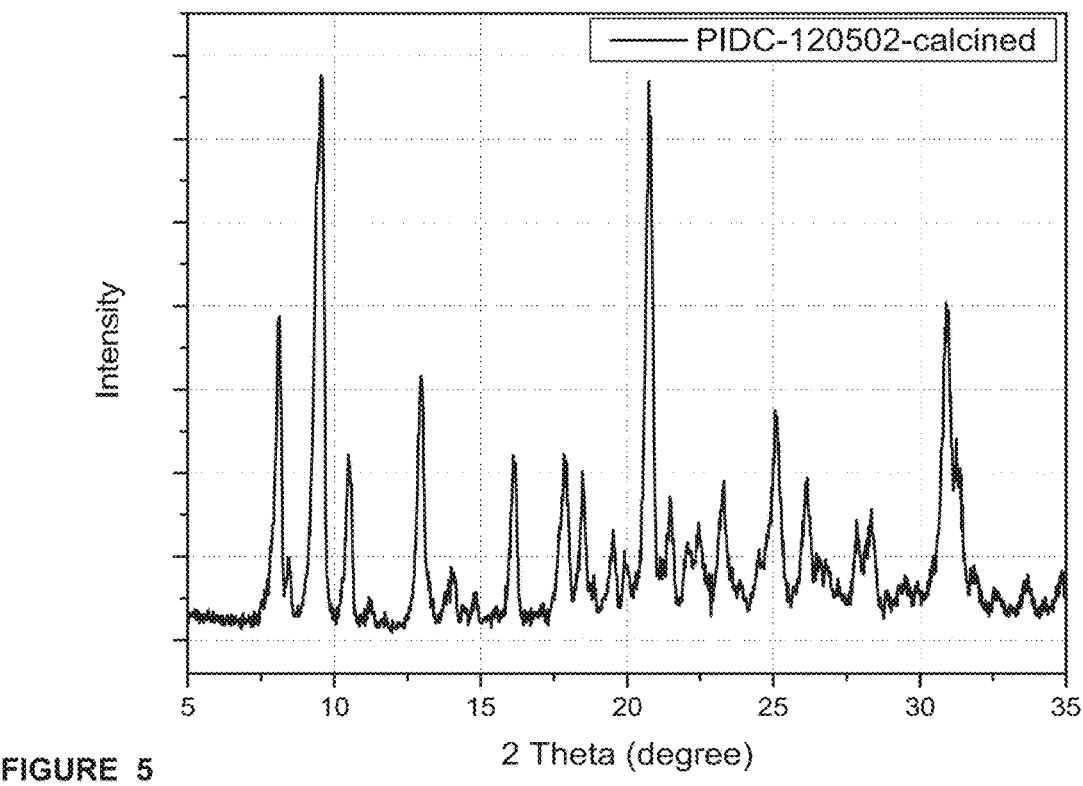
FIG. 5 is an X-ray powder diffraction analysis spectrum of the calcined zeolite prepared according to Example 2.

The X-ray diffraction (XRD) pattern of the PIDC-120502 zeolite product obtained from this procedure is provided in FIGS. 4 & 5. The XRD analysis shows that this zeolite is composed of both phases of SSZ-13 and SSZ-23 where each of the peaks with a 2 theta at: 8.22, 9.68, 14.51, 15.55, 17.9, 18.58, 19.3, 19.66, 21.5, and 27.4 are attributed to the SSZ-23 phase, while each of the other peaks is attributed to the SSZ-13 phase. The X-ray diffraction (XRD) pattern of PIDC-120502 material in this example is found to be similar to that of PIDC-120501 material (see Example 1), except that the relative intensities of the peaks attributed to the SSZ-23 phase are increased. This increase in peak intensities is due to the longer reaction time, which favors the crystallization of SSZ-23 zeolite phase.

EXAMPLE 3

Synthesis of Conventional Pure SSZ-13 (PIDC-110801)

Sodium hydroxide solution and N,N,N-trimethyl-1-adamantamonium hydroxide are combined. Aluminum trihydroxide is added followed by silica Aerosil 200. To the resulting mixture D.I. water is added. The reactants are stirred until a homogeneous milky solution is obtained. The obtained slurry is transferred into a 2.0 L Parr stainless steel vessel and the vessel is sealed. The reactor vessel is heated at 150° C. for 4 days. Upon cooling, the contents of the reactor vessel are poured into a filter and the crystals washed with distilled water and dried overnight at 120° C. After synthesis, the zeolites powder is calcined before ion exchange in order to remove the zeolite framework structure-directing agent.

Figure 6:
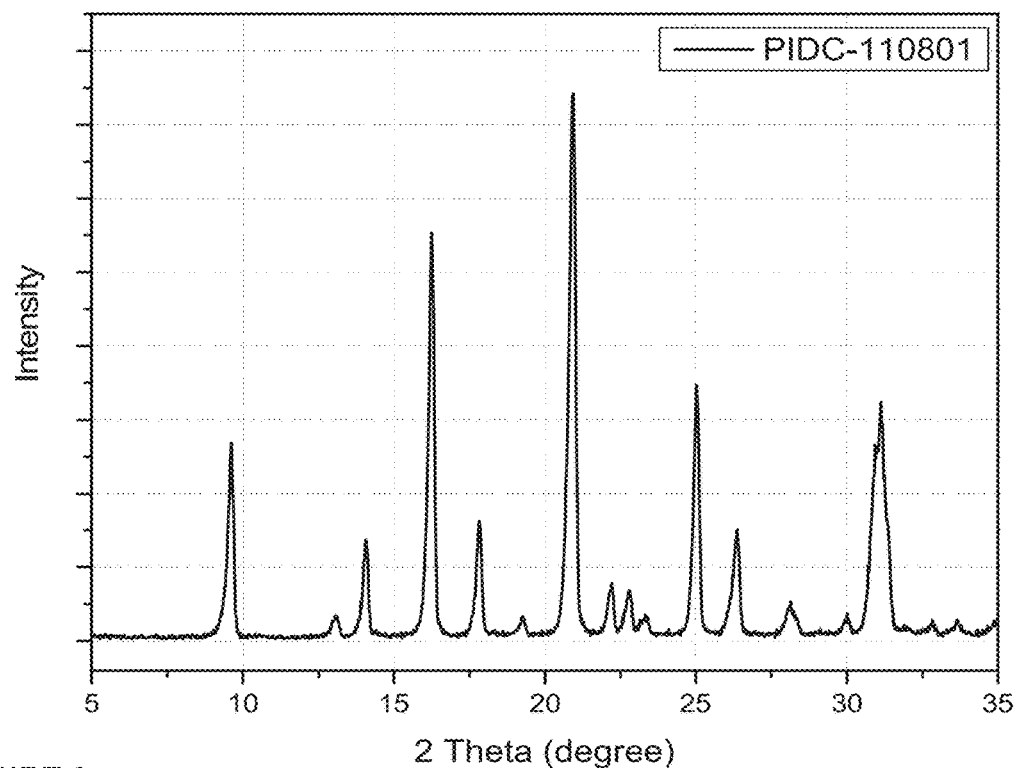
FIG. 6 is an X-ray powder diffraction analysis spectrum of a zeolite prepared according to Example 3.
Figure 7:
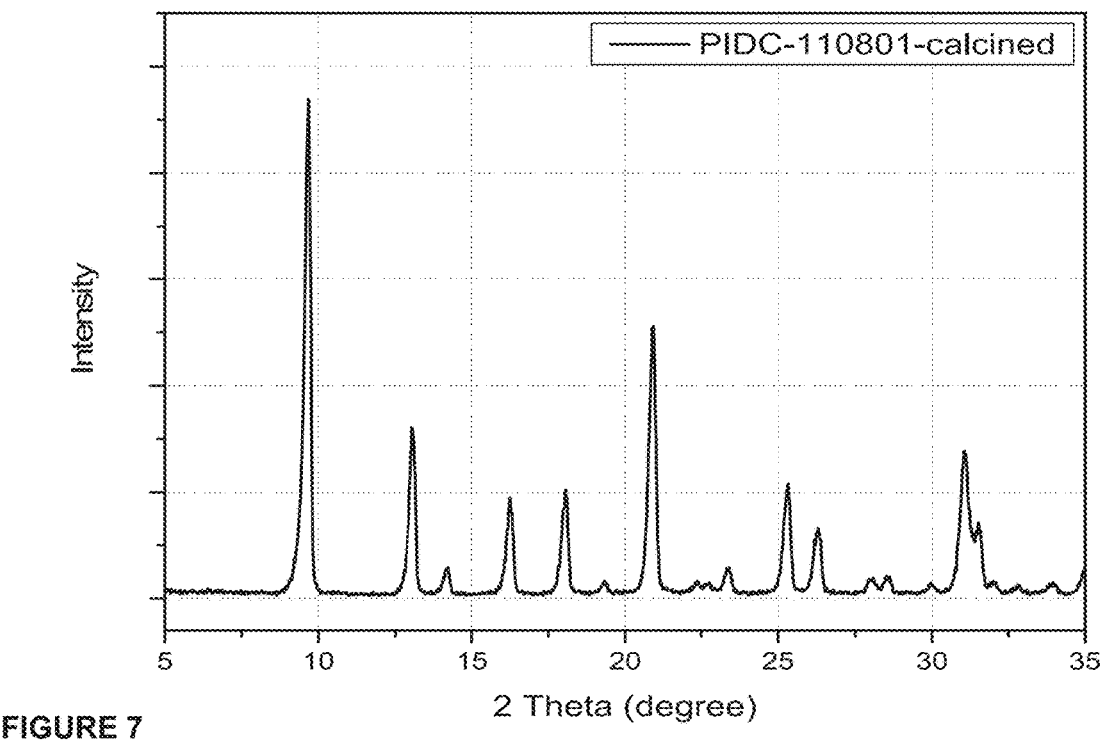
FIG. 7 is an X-ray powder diffraction analysis spectrum of the calcined zeolite prepared according to Example 3.

The X-ray diffraction pattern of the conventional zeolite product obtained from this procedure is provided in FIGS. 6 & 7. The differences observed between the conventional zeolite prepared in the example and the zeolites of the present disclosure as prepared in Examples 1 and 2 are the presence of peaks with a 2 theta degree at: 8.22, 9.68, 14.51, 15.55, 17.9, 18.58, 19.3, 19.66, 21.5, and 27.4, which are attributed to the occurrence of a SSZ-23 phase. These peaks are not present in the XRD pattern of the conventional SSZ-13 zeolite prepared in this example.

Figure 8:
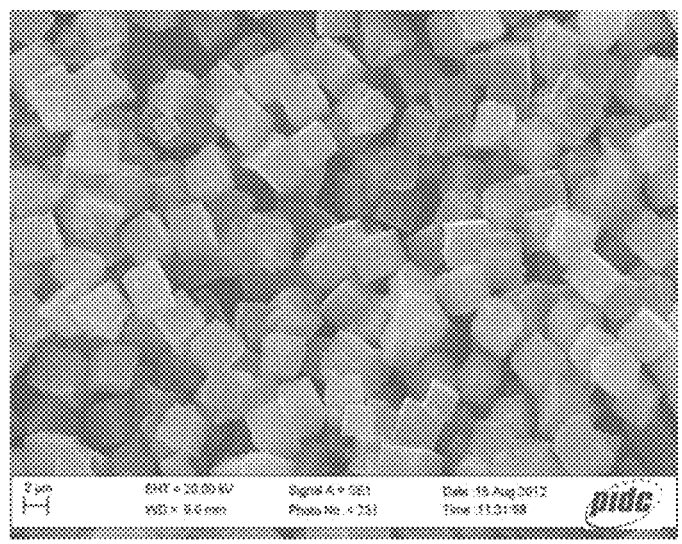
FIG. 8 provides scanning electron microscope (SEM) images of the products obtained in the syntheses (a) existing SSZ-13 (CHA), (b) PIDC-120501 zeolite-type material, and c) PIDC-120502 zeolite-type material.
Figure 8:
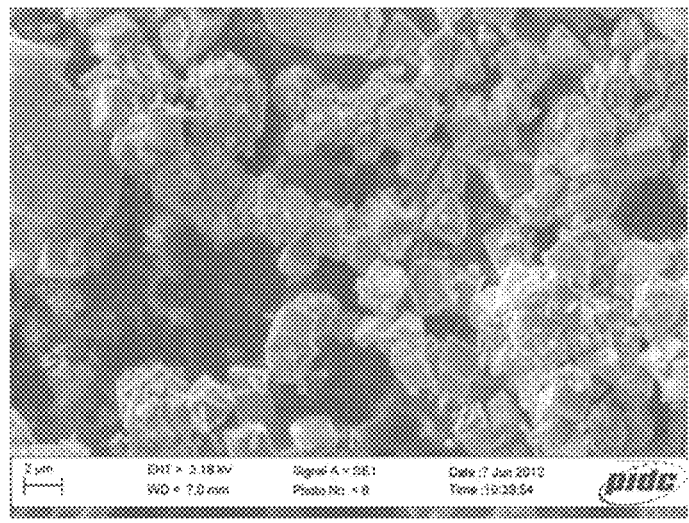
Figure 8:
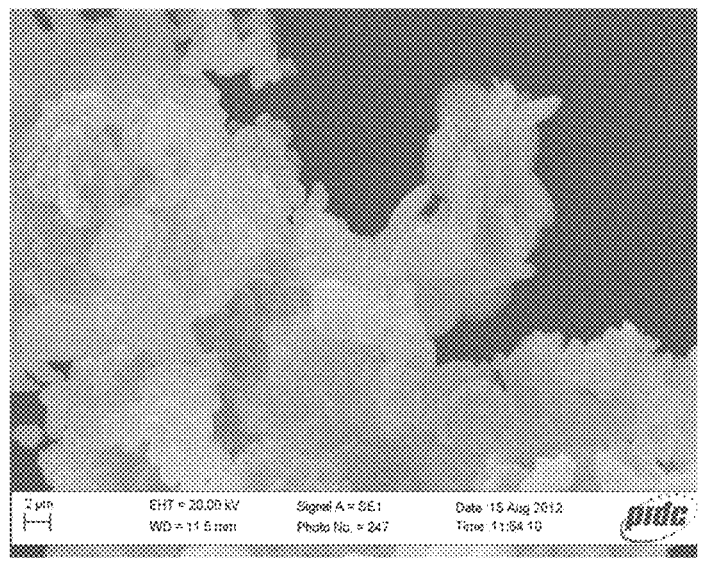

Referring now to FIG. 8, scanning electron microscope (SEM) images of the products obtained in the syntheses (A) Example 3—existing SSZ-13 (CHA), (B) Example 1—PIDC-120501 zeolite-type material, and (C) Example 2—PIDC-120502 zeolite-type material are compared. In FIG. 8A, the existing SSZ-13 zeolite exhibits the cubic shape of a typical chabazite zeolite with an average particle size of 2-10 μm. In FIG. 8B, the PIDC-120501 material, however, exhibits a mixture of cubes and spherical shaped particles, e.g., rods. In FIG. 8C, the PIDC-120502 material also exhibits a mixture of cubes and spherical shaped particles. In this figure, the surface of spherical shaped particles are aggregated with cubic crystals. Thus the materials prepared according to the present disclosure (FIGS. 8B and 8C) exhibit the cubic particles indicative of an SSZ-13 zeolite structure co-crystallized with spherical shape particles indicative of an SSZ-23 zeolite structure.

EXAMPLE 4

Temperature Programmed Desorption

Figure 9:
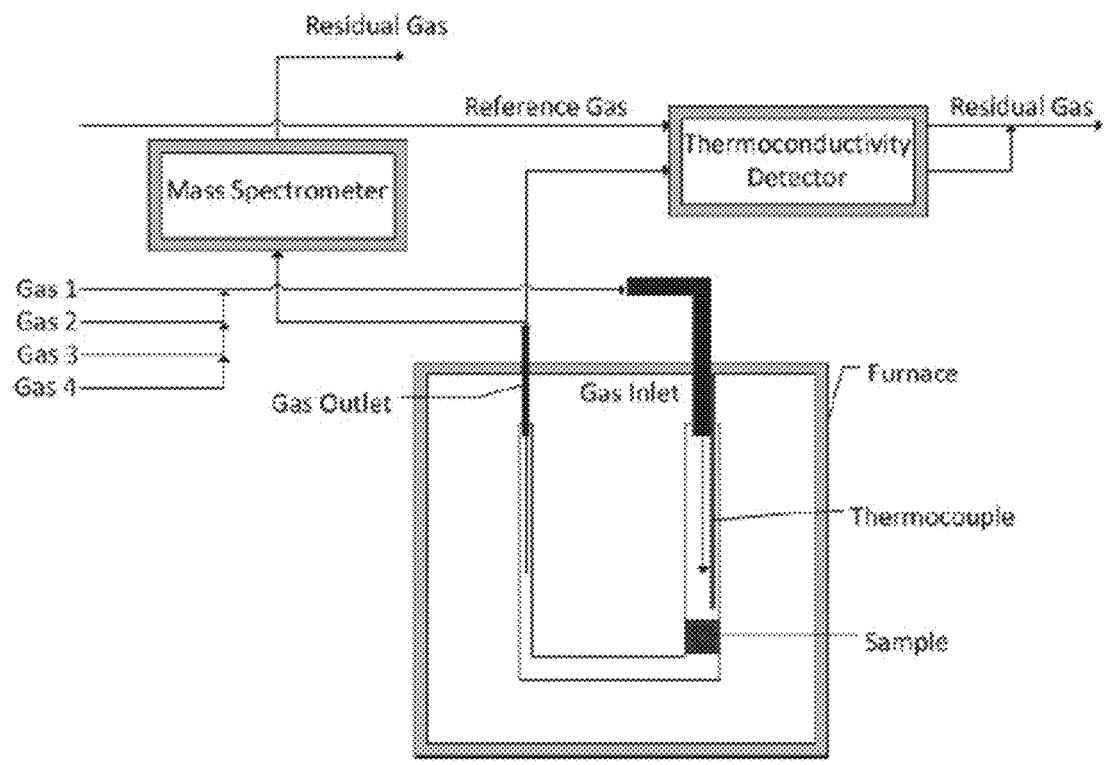
FIG. 9 is a schematic diagram of the TPD instrumentation.

Temperature-programmed desorption of basic molecules $NH_3$ and N-propyalamine are applied to study the overall nature and distribution of the acid sites on the existing SSZ-13, and the PIDC zeolite-type materials prepared herein. TPD spectra are recorded on 2920 Micromeritic instrument connected with a thermal conductivity detector (TCD) in MKS Cirrus Mass Spec equipment. The schematic diagram is shown in FIG. 9.

Typically for $NH_3$-TPD, 0.1 g catalyst is pretreated at 500° C. for 30 minutes at a rate of 20° C./min in helium flowing at 25 mL min$^{-1}$ and then cooled to adsorption temperature of 100° C. The catalyst is saturated with diluted ammonia (10% Ammonia/90% Argon) at 100° C. for 30 minutes. After saturation the sample is purged with helium at 25 mL min$^{-1}$, for 20 minutes to remove the weakly adsorbed ammonia on the surface of the zeolite. The temperature of the sample is then raised at a heating rate of 20°

C./min from 100° C. to 650° C., with the flow helium maintained at 25 mL min$^{-1}$, and then finally held at 650° C. for 40 minutes. A mass spectrometer is used to monitor desorbed NH$_3$.

Typically, for N-propylamine-TPD, 0.1 g catalyst is pretreated at 500° C. for 30 minutes in helium flowing at 25 mL min$^{-1}$ and then cooled to adsorption temperature of 100° C. The flask containing N-propylamine is heated at 60° C. to generate the N-propylamine vapors. The catalyst is dosed with diluted N-propylamine. Dosing is repeated until the sample is saturated, which is evidenced by the presence of 5 peaks of equal height. After saturation the sample is purged with helium at 25 mL min$^{-1}$, for 20 minutes to remove the weakly adsorbed ammonia on the surface of the zeolite. The temperature of the sample is then raised at a heating rate of 20° C./min from 100° C. to 650° C., while flow helium is at 25 mL min$^{-1}$. A mass spectrometer is used to monitor desorbed N-propylamine.

Figure 10:
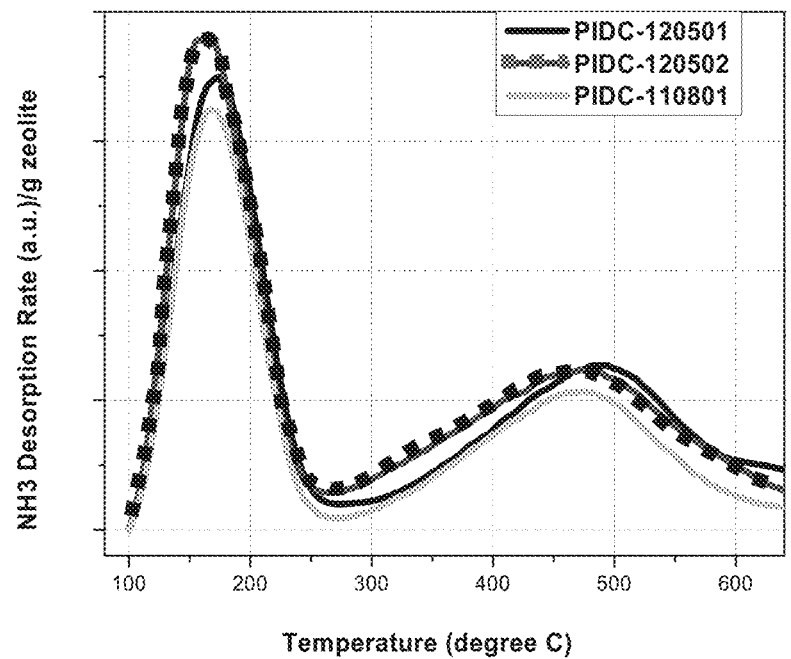
FIG. 10 is a graphical representation of the ammonia desorption profiles exhibited by fresh zeolite samples prepared according to the teachings of the present disclosure.
Figure 11:
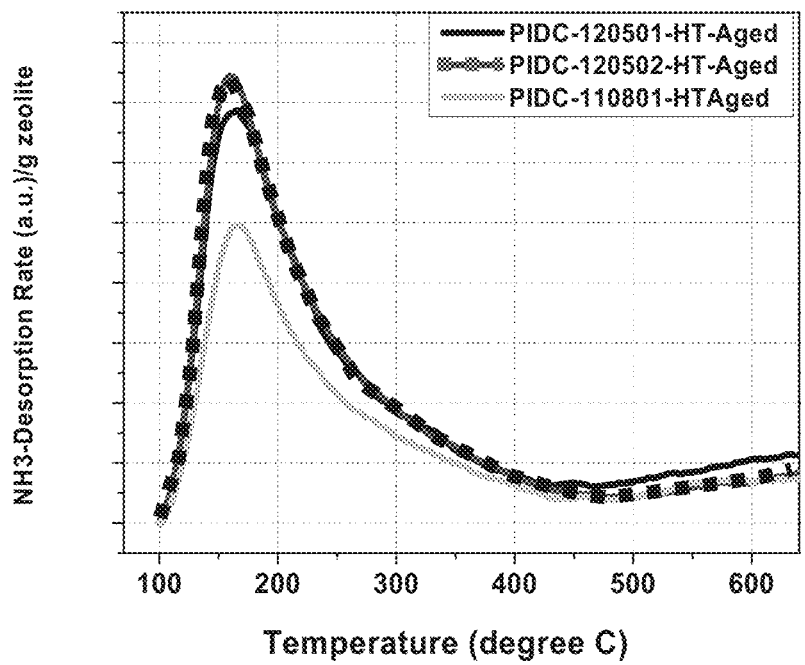
FIG. 11 is a graphical representation of the ammonia desorption profiles exhibited by hydrothermally aged (750° C. for 24 hours, 10% H2O) zeolite samples.

The amounts of ammonia desorbed from the three samples are evaluated from their TPD peak areas. (FIG. 10.) Two NH$_3$ desorption peaks are present. The NH$_3$ desorption peak at ~160° C. is associated with weak acid sites and the other peak at higher than 480° C. is associated with strong acid sites. The three zeolites PIDC-120501, PIDC-120502 and PIDC-110801 (conventional) show different acidity. The ammonia desorption profiles of the hydrothermally aged zeolite samples are shown in FIG. 11. The adsorption performance of the new PIDC zeolite-type material is considerably high in comparison to the pure SSZ-13 for both the fresh and the aged samples. As shown in Table 2, the desorption capacity of ammonia on these samples increased in the order: PIDC-110801 (conventional)<PIDC-120501<PIDC-120502.

TABLE 2

| Lot # PIDC | Acidity (mmol/g) | Desorption Temp. |
|---|---|---|
| 120501 | 0.77 | 493.3 |
| 120502 | 1.065 | 512 |
| 110801 (Conventional) | 0.768 | 474 |

Figure 12:
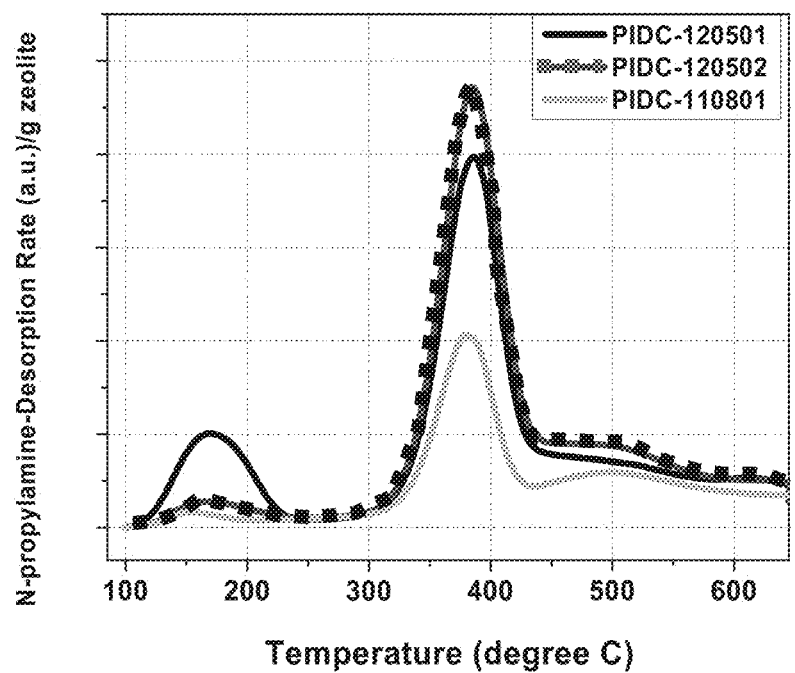
FIG. 12 is a graphical representation of the N-propylamine desorption profiles exhibited by fresh zeolite samples prepared according to the teachings of the present disclosure.
Figure 13:
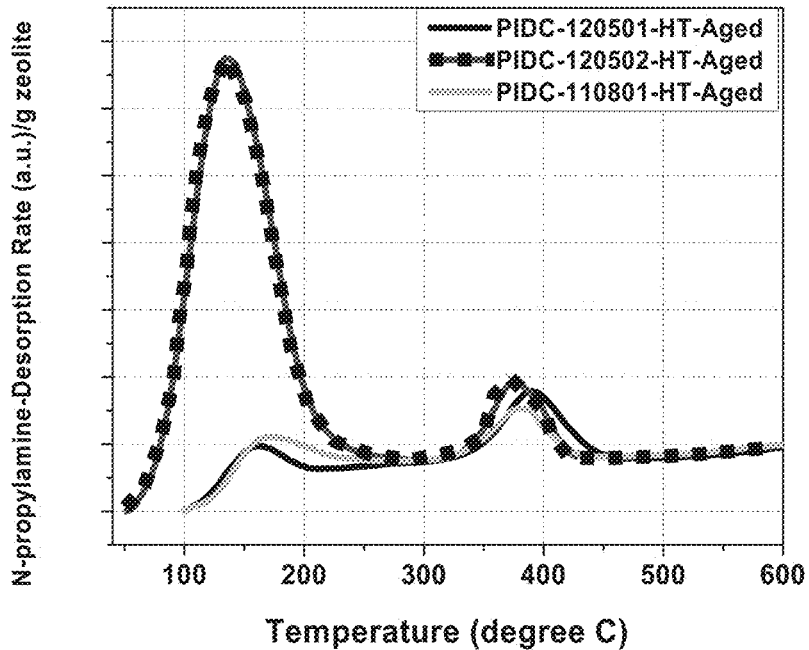
FIG. 13 is a graphical representation of the N-propylamine desorption profiles exhibited by hydrothermally aged (750° C. for 24 hours with 10% water vapor) zeolite samples.
Figure 14:
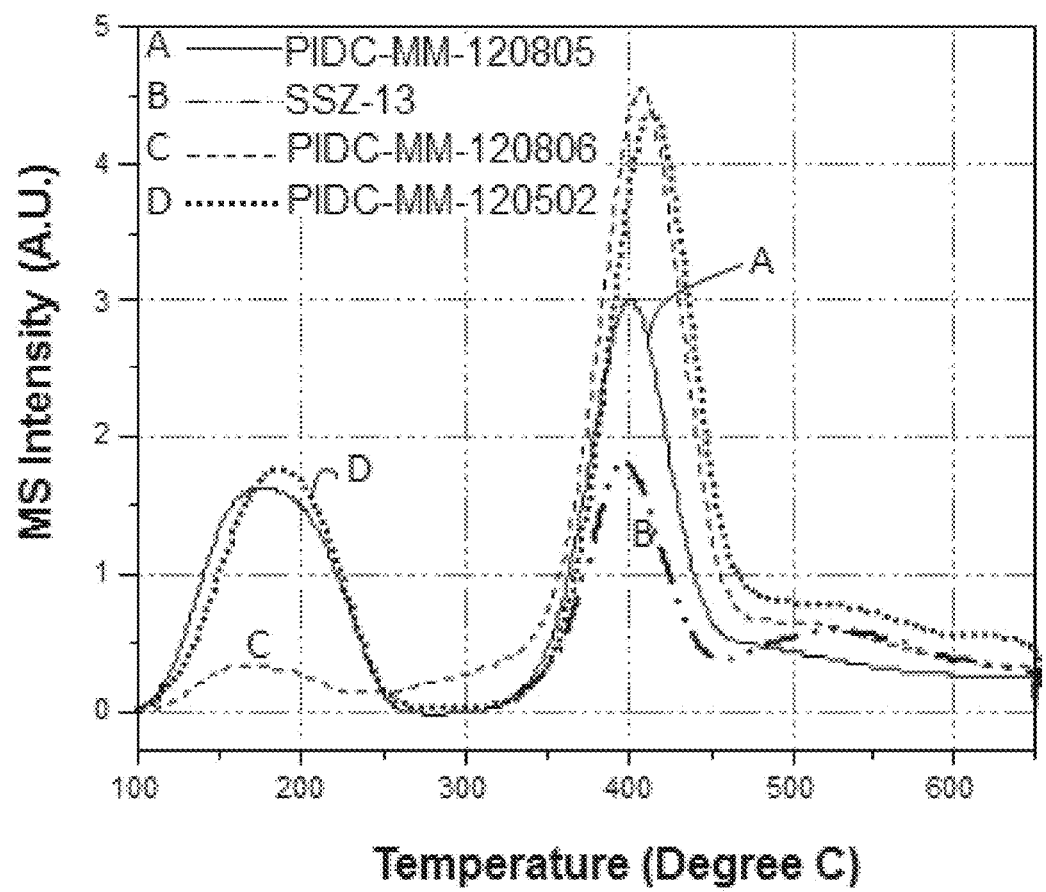
FIG. 14 is a graphical representation of the N-proplyamine and propylene desorption profiles exhibited by zeolite samples prepared according to the teachings of the present disclosure.

The results of N-propylamine TPD profiles are shown in FIGS. 12 and 14 for the fresh samples and FIG. 13 for the aged samples, respectively. All samples exhibit two desorption peaks: at 160° C. and 380° C., which suggests the presence of two energetically active types of adsorption sites for N-propylamine on these samples indicative of N-propylene acidity and propylene acidity. The higher temperature desorption peak can be attributed to stronger interactions of N-propylamine with the silanol groups present at the surface of the zeolite samples. The adsorption performance of the PIDC zeolite-type materials of the present disclosure is considerably high over the existing or conventional SSZ-13.

Figure 15:
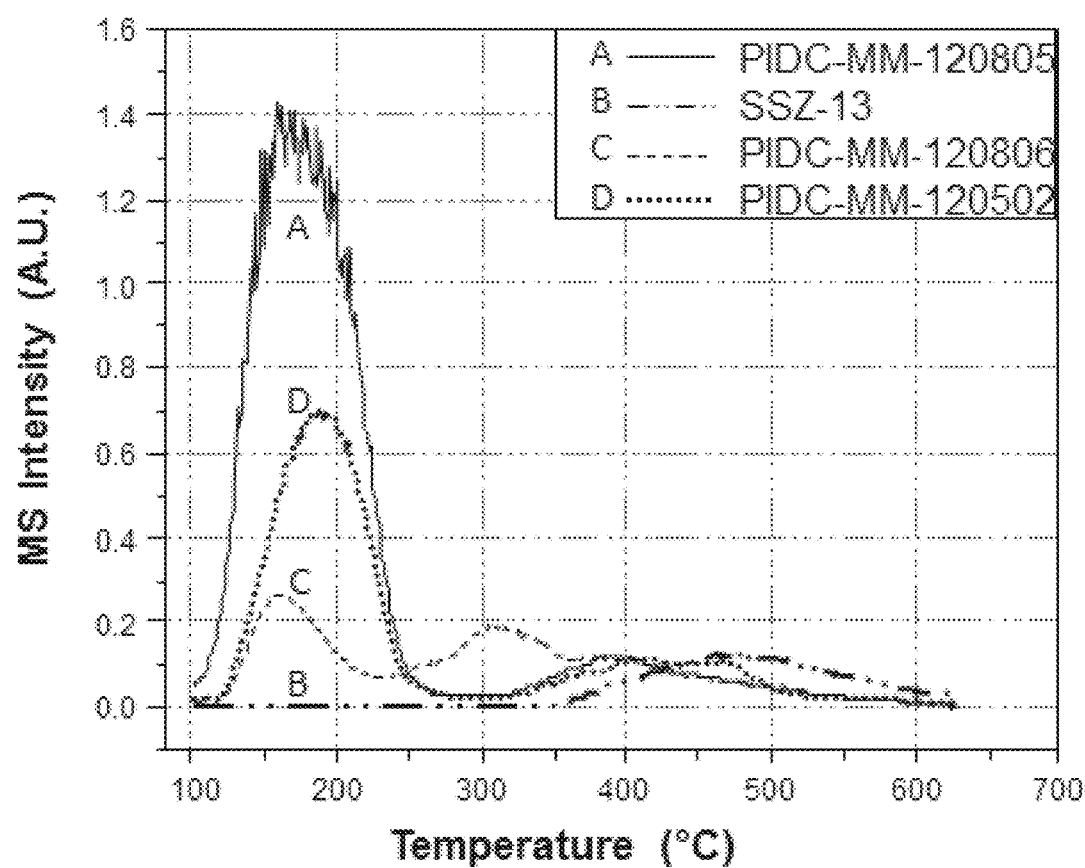
FIG. 15 is an expanded view of the N-propylamine desorption profile exhibited by the samples from the graph shown in FIG. 14.
Figure 16:
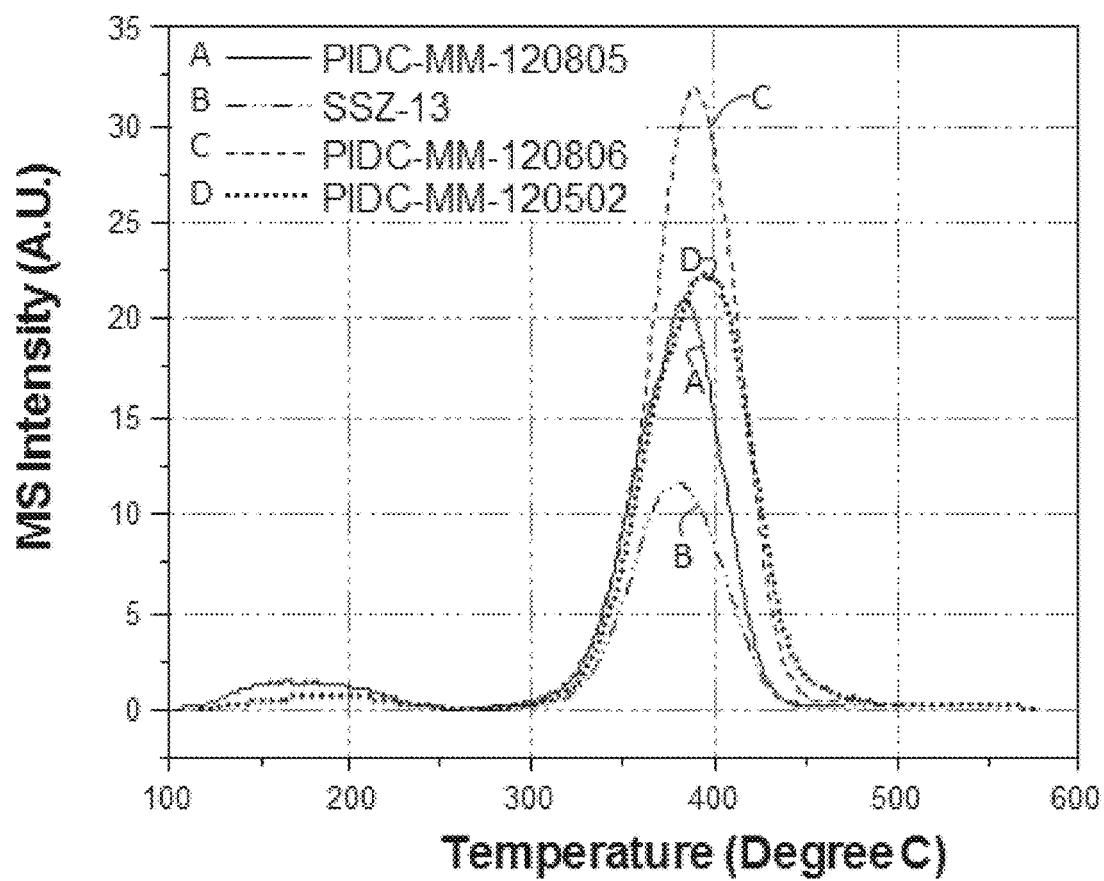
FIG. 16 is an expanded view of the propylene desorption profile exhibited by the samples from the graph shown in FIG. 14.

An expanded view of the desorption profile from FIG. 14 is provided in FIG. 15 for the portion of the curve corresponding to N-proplyamine acidity and in FIG. 16 for the portion of the curve corresponding to propylene acidity. In both curves the absorption of the PIDC zeolite-type materials of the present disclosure is considerably higher than the absorption of existing or conventional SSZ-13. In fact, the quantity of propylene obtained from the desorption (e.g., the area under the curve in FIG. 16 corresponds to 1.61 millimoles per gram of SSZ-13 material, while the PIDC-120805, PIDC-120502, and PIDC-120806 zeolite-type materials exhibits 2.86, 3.48, and 4.27 millimoles per gram of zeolite material. Thus the PIDC zeolite-type materials exhibit a greater number of Broensted acid sites, as well as Broensted acid sites that are significantly stronger than the sites present in the SSZ-13 zeolite material. In fact, these Broensted acid sites results in the zeolite-type material exhibiting greater than a 50% increase in N-propylamine temperature desorption over the SSZ-13 zeolite.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A crystalline, modified STT-type zeolite material for use as a catalyst, the modified STT-type zeolite material comprising a mole ratio ranging from 19:1 up to 50:1 of an oxide of a tetravalent element to an oxide of a trivalent element, and having peaks in an x-ray diffraction pattern with a 2 theta degree at 8.22, 9.68, 14.51, 15.55, 17.9, 18.58, 19.3, 19.66, 21.5, and 27.4 attributed to the presence of an SSZ-23 zeolite phase and the other peaks in the x-ray diffraction pattern being attributed to the presence of an SSZ-13 zeolite phase;
wherein the peak intensities in the x-ray diffraction pattern for the peaks attributed to the SSZ-13 zeolite phase are greater than the peak intensities of the peaks attributed to the SSZ-23 zeolite phase.

2. The modified STT-type zeolite material of claim 1, wherein the mole ratio of the oxide of the tetravalent element to the oxide of the trivalent element is about 28:1.

3. The modified STT-type zeolite material of claim 1, wherein the zeolite-type material further includes a metal selected as one from the group of copper, iron, cobalt, zirconium, titanium, and a mixture thereof;
wherein the metal containing zeolite-type material functions as a catalyst in a selective catalytic reduction (SCR) reaction.

4. The modified STT-type zeolite material of claim 3, wherein the metal present in the catalyst ranges from 0.3 to 10.0%, based on the total weight of the zeolite catalyst.

5. The modified STT-type zeolite material of claim 3, wherein the catalyst contains ion-exchanged metal Cu, Fe, Co, Zr, or Ti, sufficient to maintain NO$_x$ conversion performance in an exhaust gas stream containing nitrogen oxides;
wherein the NO$_x$ conversion performance of the fresh catalyst at about 500° C. is about 70%.

6. The modified STT-type zeolite material of claim 5, wherein the catalyst is hydrothermally aged and the NO$_x$ conversion performance of the hydrothermally aged catalyst at about 200° C. is 30%.

7. The modified STT-type zeolite material of claim 3, wherein the metal containing zeolite-type material is deposited onto a honeycomb structure, a metal substrate or a formed extrudate.

8. The modified STT-type zeolite material of claim 1, wherein the zeolite-type material is characterized by ammonia temperature desorption and n-propylamine temperature desorption that is at least 1.4 and 2.0, respectively, times greater than the corresponding desorption of a SSZ-13 zeolite.

9. The modified STT-type zeolite material of claim 8, wherein the zeolite-type material is hydrothermally aged and the hydrothermally aged zeolite-type material is characterized by ammonia temperature desorption and n-propylamine temperature desorption that is at least 1.5 and 6.5, respectively, times greater than the corresponding desorption of a SSZ-13 zeolite.

10. The modified STT-type zeolite material of claim 1, wherein the zeolite-type material is characterized by Broensted acid sites that are stronger and present in a greater number than such sites in a SSZ-13 zeolite;
wherein the Broensted acid sites results in the zeolite-type material exhibiting greater than a 50% increase in n-propylamine temperature desorption over the SSZ-13 zeolite.

11. A method of preparing a metal containing catalyst, the method comprising the steps of:
providing a modified SST-type zeolite according to claim 1;
dealuminating a modified SST-type zeolite with nitric acid, the modified SST-type zeolite comprising cubic particles of an SSZ-13 zeolite structure co-crystallized with spherical shape particles of an SSZ-23 zeolite structure;
impregnating or ion-exchanging the dealuminated zeolite with an aqueous metal salt solution; and
incorporating a metal selected as one from the group of Cu, Fe, Co, Zr, Ti, or a mixture thereof into the framework sites of dealuminated zeolite.

12. The method of claim 11, wherein the catalyst incorporates the metal in the framework in an amount sufficient to maintain $NO_x$ conversion performance in an exhaust gas stream containing nitrogen oxides.

13. The method of claim 11, wherein the method further comprises depositing the catalyst onto a honeycomb substrate, a metal substrate or an extruded substrate.

14. The method of claim 13, wherein the honeycomb substrate comprises a wall flow substrate.

15. The method of claim 11, the method further comprising preparing the modified STT-type zeolite, said modified STT-type zeolite being prepared by
forming an aqueous reaction mixture comprising a source of the oxide of tetravalent element; a source of the oxide of the trivalent element; a source of alkali metal; and an organic structure directing agent wherein at least a portion of which is N,N,N-trimethyl-1-adamantamonium hydroxide;
maintaining the aqueous mixture under crystallization conditions sufficient to crystallize crystals of a zeolite type material having an x-ray diffraction pattern as provided in FIG. 2; and
recovering the zeolite crystals.

16. The method of claim 15, wherein the source of the tetravalent element oxide is fumed silica with a water content of about 2 wt. %.

17. The method of claim 15, wherein the source of trivalent element oxide is aluminum trihydroxide.

18. The method of claim 15, wherein the alkali metal cation balances the valence electrons charges in the crystalline zeolite-type material.

19. The method of claim 15, wherein the method further comprises heating the zeolite to a temperature of at least 150° C.

* * * * *